United States Patent Office 2,913,340
Patented Nov. 17, 1959

2,913,340

ANIMAL FEED SUPPLEMENT

Francis W. Chornock, Farmersburg, and Joseph M. Pensack, Terre Haute, Ind., assignors to Commercial Solvents Corporation, Terre Haute, Ind., a corporation of Maryland No Drawing. Application January 22, 1958
Serial No. 710,417

10 Claims. (Cl. 99—2)

Our invention relates to a feed supplement and more particularly, it relates to a feed supplement containing the fermentation residues resulting from the production of gibberellic acid when the organism Gibberella fujikuroi is cultivated in a liquid nutrient medium and the gibberellic acid is removed therefrom.

For some years there has been extensive study of the need for various nutrients for feed for poultry and livestock. This study has resulted in the evolution of feeds compounded to include all the ingredients necessary to provide the proper proportions of materials such as, for example, proteins, carbohydrates, minerals, vitamins, etc., as well as the formulation of rations designed for specific feeding purposes. Following the development of rations balanced in essential nutrients, it was found that other substances such as vitamin $B_{12}$ could be included in the rations which would serve as growth promoters and increase the rate at which livestock develop, resulting in a larger animal at an earlier age.

Recently, it has been found that the inclusion of certain antibiotics in feed supplements acts to give additional growth-promoting effects and aids in producing larger animals at an earlier age than can be done with feed containing only growth-promoters such as vitamin $B_{12}$.

We have now discovered that fermentation residues obtained from the production of gibberellic acid by cultivating the organism G. fujikuroi in a nutrient medium and removing the gibberellic acid therefrom causes increased growth over and above the normally expected growth when a well balanced diet containing these residues is fed to cattle and chickens.

Furthermore, we have found that the addition of gibberellic acid fermentation residues to animal and fowl rations causes an additional growth-promoting effect above the effect normally obtained when unknown growth factors from fish solubles and dried whey are added to a balanced ration.

Our new invention is a feed supplement containing as its essential active ingredient the fermentation residues obtained from the production of gibberellic acid by cultivating the organism G. fujikuroi in a liquid medium after the gibberellic acid has been removed therefrom. Our novel feed supplement can be mixed with diluents which can, or cannot, have nutritive value, and which can, or cannot, be active as far as growth-promoting effect is concerned.

The gibberellic acid fermentation residues utilized in our invention can be prepared by fermentation of a gibberellic acid producing organism of the species Gibberella fujikuroi or what is considered to be its asexual form, Fusarium moniliforme, under conditions which are comparable to riboflavin fermentations. For instance, in a commercial fermentation, a G. fujikuroi inoculum is introduced into a fermenter containing a suitable source of carbohydrate, such as sucrose, starch, molasses, etc., a nitrogen source, such as yeast extract, tryptose broth, a lipid, such as lard oil, and various inorganic salts.

The fermentation medium is adjusted to about 6.0 with ammonia prior to introduction of the inoculum. The fermentation is agitated by passing air at a ratio of about 0.5:1 volume of air per volume of mash through the fermenting medium and is maintained at 28° C. for five to six days. At this time the gibberellic acid is separated from the mycelium by filtration. After the mycelium is dried it is found to have a typical analysis of between about 10–22% protein and from about 4–35% fats.

We have found that at least 0.25% gibberellic acid fermentation residues are necessary to produce a significant increase in the growth rate of poultry. About 2% fermentation residues have been found necessary for optimum growth in chicks. The following table sets out various minimum amounts of fermentation residues necessary to produce added growth in the described animal or fowl.

| Percent Fermentation Residue Necessary | Animal |
|---|---|
| 0.5 | Calves. |
| 0.5 | Lambs. |
| 0.5 | Swine. |
| 0.5 | Turkeys. |
| 0.5 | Ducks. |
| 0.25 | Chickens. |

The following illustrations further disclose our invention but it is not intended that our invention be restricted to the amounts, animals, procedures, etc. set out. Rather, it is intended that all equivalents obvious to those skilled in the art be included within the scope of our invention as claimed.

EXAMPLE I

To prepare the feed supplement of our invention, the Fusarium moniliforme contained on an agar slant was introduced into a 500 ml. wide mouth Erlenmeyer flask containing 100 ml. of the following medium adjusted to pH 6 with ammonia.

| | Percent |
|---|---|
| Sucrose | 2.0 |
| Lard | 1.0 |
| Steep liquor | 1.0 |
| $KH_2PO_4$ | .15 |
| $K_2SO_4$ | .05 |
| $MgSO_4$ | .02 |
| $ZnSO_4$ | .01 |
| $FeSO_4$ | .01 |
| $MnSO_4$ | .005 |
| Tap water. | |

The inoculum was incubated on a rotary-type shaker at 200 to 300 revolutions per minute at 28° C. for two to three days. Further small scale fermentations were carried out in the same medium to obtain a desired inoculum. A 1% inoculum was found to be suitable for optimum growth in large fermentations. When 1 gallon of inoculum was obtained, it was introduced into 60 gallons of a medium consisting of sucrose 2%, corn steep liquor 1%, lard oil 1% and tap water, adjusted to pH 6.0 with ammonia. Agitation was obtained by passing 8–10 c.f.m. through the fermentation medium which was maintained at about 28° C. throughout the fermentation period. The fermentation was stopped at the end of six days and the whole beer was adjusted from a pH of 5.1 to a pH of 3.2 with 50% sulfuric acid, and vacuum filtered to remove the gibberellic acid. The mycelial cake was removed from the filter and dried on a small drum-drier at 148° C. About 4 pounds, 6 ounces of a golden brown, oily, aromatic, flaky product resulted. This sample analyzed 11.53% protein (based on Kjeldahl nitrogen) and 34.9% fat.

EXAMPLE II

To test the growth-promoting qualities of the gibberellic acid fermentation residues, the following basal chick ration was prepared.

*Basal chick ration*

| Ingredient: | Amount/cwt. |
|---|---|
| Finely ground yellow corn _____lbs__ | 60.75 |
| Soybean oil meal, solvent, 44% __lbs__ | 35.00 |
| Dicalcium phosphate _____lbs__ | 2.00 |
| Ground limestone _____lbs__ | 1.50 |
| Iodized salt _____lbs__ | 0.50 |
| DL-methionine _____lbs__ | 0.10 |
| Choline chloride, 70% _____lbs__ | 0.0625 |
| Butylated hydroxy toluene ____lbs__ | 0.0125 |
| Manganese sulfate, 70% _____lbs__ | 0.025 |
| Vitamin A supplement (10,000 I.U./gm.) grams__ | 40 |
| Vitamin D-3 supplement (1,500 I.C.U./gm.) grams__ | 27.5 |
| Niacin _____do____ | 1.5 |
| Calcium pantothenate _____do____ | 0.5 |
| Crystalline zinc bacitracin (Lot 80504 B) grams__ | 0.375 |
| Crystalline procaine penicillin (Lot 74103 C) grams__ | 0.125 |
| Crystalline riboflavin _____do____ | 0.30 |
| Crystalline vitamin B-12 _____mgms__ | 0.60 |

*Calculated analysis*

21.1% protein.
2.48% fat.
3.79% fiber.
1.18% calcium.
1.74% phosphorus.
1.22% arginine.
0.50% methionine.
0.31% cystine.
1.06% lysine.
0.23% tryptophan.
1.00% glycine.

Productive energy, 895 gal./lb.
Riboflavin, 3.75 mg./lb.
Choline, 713 mg./lb.
Niacin, 25.1 mg./lb.
Pantothenic acid, 8.5 mg./lb.
Vitamin A, 4611 I.U./lb.
Vitamin D-3, 413 I.C.U./lb.
Calorie/protein ration, 42.4.

As a positive control 1% liquid fish solubles and 1% dried whey were added to part of the basal ration to obtain a positive unknown growth factor control. To another portion of the basal ration 2% gibberellic acid fermentation residues were added. Two tests were carried out, utilizing duplicate lots of twelve Vantress-Thompson White Rock male chicks. At the end of twenty-eight days the chicks were weighed and the amount of weight gain determined from Assay Groups I and II. The following table sets out the amount of weight gain and the percent response for each of these tests.

*Average weight gain in grams*

CHICK ASSAY #I
[28 day test period]

| Supplement | Lot 1 | Lot 2 | Average | Percent Growth Response |
|---|---|---|---|---|
| Basal ration | 421.7 | 399.4 | 410.5 | ---- |
| 1% fish solubles and 1% dried whey | 435.1 | 443.8 | 439.4 | 7.0 |
| 2% Gibberellic acid fermentation residue | 471.8 | 448.2 | 460.0 | 12.0 |

CHICK ASSAY #II

| Supplement | Lot 1 | Lot 2 | Average | Percent Growth Response |
|---|---|---|---|---|
| Basal ration | 395.2 | 370.9 | 383.0 | ---- |
| 1% fish solubles and 1% dried whey | 394.2 | 444.0 | 419.1 | 9.4 |
| 2% Gibberellic acid fermentation residue | 461.2 | 425.0 | 443.1 | 15.6 |

The following table sets out the summary of the feed conversion for Chick Assays I and II.

*Grams of feed/gram of weight gain*

CHICK ASSAY #I

| Supplement | Lot 1 | Lot 2 | Average | Percent Improvement in Feed Conversion Over Basal |
|---|---|---|---|---|
| Basal Ration | 2.09 | 2.50 | 2.30 | ---- |
| 1% fish solubles and 1% dried whey | 2.17 | 2.28 | 2.22 | 3.4 |
| 2% Gibberellic acid fermentation residue | 2.02 | 2.25 | 2.14 | 6.9 |

CHICK ASSAY #II

| Supplement | Lot 1 | Lot 2 | Average | Percent Improvement in Feed Conversion Over Basal |
|---|---|---|---|---|
| Basal ration | 2.27 | 2.28 | 2.28 | ---- |
| 1% fish solubles and 1% dried whey | 2.28 | 1.94 | 2.11 | 7.4 |
| 2% Gibberellic acid fermentation residue | 1.99 | 1.94 | 1.96 | 14.0 |

Now having described our invention, what we claim is:

1. In an animal and poultry feed supplement containing fermentation residues, the improvement which comprises a mixture of a nutrient diluent and *Gibberella fujikuroi* mycelial cake in small but effective amounts as an animal and poultry growth stimulant.

2. The supplement of claim 1 wherein the *Gibberella fujikuroi* mycelial cake represents at least 0.25% of the total mixture.

3. The supplement of claim 2 wherein the nutrient diluent is chicken feed.

4. The supplement of claim 2 wherein the nutrient diluent is turkey feed.

5. The supplement of claim 2 wherein the nutrient diluent is cattle feed.

6. The supplement of claim 2 wherein the nutrient diluent is sheep feed.

7. The supplement of claim 2 wherein the nutrient diluent is swine feed.

8. The supplement of claim 2 wherein the nutrient diluent is rabbit feed.

9. In a process for the production of a fermentation residue-containing feed supplement, the improvement which comprises mixing *Gibberella fujikuroi* mycelial cake with a nutrient diluent.

10. The supplement of claim 1 wherein the *Gibberella fujikuroi* mycelial cake represents 0.25–2.0% of the total mixture.

References Cited in the file of this patent

Stodola et al.: Archives of Biochemistry and Biophysics 54 (1955), pp. 240–5.

Chemical and Eng. News, September 1956, vol. 34, pp. 4496 and 4501.